United States Patent
Sun

(10) Patent No.: US 9,849,311 B2
(45) Date of Patent: Dec. 26, 2017

(54) MULTI-FUNCTIONAL CAR POWER RECEPTACLE HAVING LIFESAVING TOOL

(71) Applicant: SHANGHAI EASY-USE TOOLS ENTERPRISE CO.LTD, Shanghai (CN)

(72) Inventor: Shiyu Sun, Shanghai (CN)

(73) Assignee: SHANGHAI EASY-USE TOOLS ENTERPRISE CO. LTD., Shanghai (CN)

(*) Notice: Subject to any disclaimer, the term of this patent is extended or adjusted under 35 U.S.C. 154(b) by 248 days.

(21) Appl. No.: 14/421,280

(22) PCT Filed: Oct. 30, 2013

(86) PCT No.: PCT/CN2013/086223
§ 371 (c)(1),
(2) Date: Feb. 12, 2015

(87) PCT Pub. No.: WO2015/054933
PCT Pub. Date: Apr. 23, 2015

(65) Prior Publication Data
US 2016/0038773 A1 Feb. 11, 2016

(30) Foreign Application Priority Data
Oct. 18, 2013 (CN) .......................... 2013 1 0491516

(51) Int. Cl.
*A62B 3/00* (2006.01)
*B25D 1/00* (2006.01)
(Continued)

(52) U.S. Cl.
CPC ................ *A62B 3/005* (2013.01); *B25D 1/00* (2013.01); *B60R 11/00* (2013.01); *H01R 27/00* (2013.01);
(Continued)

(58) Field of Classification Search
CPC .... A62B 3/005; B25D 1/00; B25D 2250/271; B25D 2250/295; H01R 27/00; B60R 2011/0003
(Continued)

(56) References Cited

U.S. PATENT DOCUMENTS 4,512,693 A * 4/1985 Swanson ................. B23B 51/00
279/14
5,421,460 A * 6/1995 Bosshard ................. B25F 1/00
206/223
(Continued)

FOREIGN PATENT DOCUMENTS

CN 2505314 Y 8/2002
CN 203218933 U 8/2002
(Continued)

*Primary Examiner* — Hadi Shakeri
(74) *Attorney, Agent, or Firm* — Muncy, Geissler, Olds & Lowe, P.C.

(57) ABSTRACT

A multi-functional car power receptacle having a lifesaving tool includes a handle for providing a receptacle and a function head connected to a front end of the handle. The function head comprises a glass smasher and a power plug. The function head and the front end of the handle are connected through a rotation shaft, enabling the function head to pivot about the rotation shaft for changing an end of the function head to be used. The power plug is electrically connected with the handle through electric wires of the rotation shaft. The function head of the present invention combines the glass smasher with the power plug. The present invention is provided with a seat belt cutter for the driver to cut the seat belt in an emergency. The handle is provided with a magnet and a warning light.

13 Claims, 3 Drawing Sheets

(51) Int. Cl.
*H01R 27/00* (2006.01)
*B60R 11/00* (2006.01)

(52) U.S. Cl.
CPC .. *B25D 2250/271* (2013.01); *B25D 2250/295* (2013.01); *B60R 2011/0003* (2013.01)

(58) Field of Classification Search
USPC .......................................... 7/158, 144, 143
See application file for complete search history.

(56) References Cited

U.S. PATENT DOCUMENTS

| | | | | |
|---|---|---|---|---|
| 5,642,567 | A | * | 7/1997 | Lin ................... A62B 3/005 30/366 |
| 5,952,916 | A | * | 9/1999 | Yamabe ............... B25D 1/00 340/321 |
| 6,454,430 | B1 | * | 9/2002 | Lin ................... A62B 3/005 362/109 |
| 7,028,874 | B2 | | 4/2006 | Lin |
| 8,595,874 | B1 | * | 12/2013 | Knapp ................ B25F 1/006 7/138 |

FOREIGN PATENT DOCUMENTS

| | | |
|---|---|---|
| CN | 2764676 Y | 3/2006 |
| CN | 203078377 U | 7/2013 |

\* cited by examiner

MULTI-FUNCTIONAL CAR POWER RECEPTACLE HAVING LIFESAVING TOOL

BACKGROUND OF THE INVENTION

1. Field of the Invention

The present invention relates to a multi-functional car power receptacle having a lifesaving tool.

2. Description of the Prior Art

In an emergency situation, for example, there is a fire or a car falls into the water, the driver can smash the window by using a glass smasher in the car so as to flee from the car. The glass smasher must be placed near the driver for the driver to take it easily at any time. But, the space near the driver seat is limited. It is necessary to solve the problem where it is the appropriate place to place the glass smasher. Accordingly, the inventor of the present invention has devoted himself based on his many years of practical experiences to solve these problems.

SUMMARY OF THE INVENTION

The primary object of the present invention is to provide a multi-functional car power receptacle having a lifesaving tool to overcome the problem of the prior art. The present invention can be directly mounted to the connecting port of the cigarette lighter receptacle in a car for convenient use.

In an embodiment, the multi-functional car power receptacle having a lifesaving tool of the present invention comprises a handle for providing a receptacle and a function head connected to a front end of the handle. The function head comprises a glass smasher and a power plug. The function head and the front end of the handle are connected through a rotation shaft, enabling the function head to pivot about the rotation shaft for changing an end of the function head to be used. The power plug is electrically connected with the handle through electric wires of the rotation shaft.

Preferably, the handle is further provided with a seat belt cutter.

Preferably, the handle is provided with a magnet and a warning light.

Preferably, the handle has at least one receptacle shunt hole and at least one USB (Universal Serial Bus) port.

The function head of the present invention combines the glass smasher with the power plug. Through the rotation shaft, the function head can be turned to change the end to be used. The glass smasher and the power plug can be directly plugged into a connecting port of the existing power socket in a car. The product can be plugged into the power socket all the time. It is not easy to lose the receptacle, and it is convenient for taking and use. The present invention is provided with a seat belt cutter for the driver to cut the seat belt in an emergency. The handle is provided with a magnet and a warning light. In case in a situation that there is no light at night, the engine of the car malfunctions and the driver has to repair the engine with both hands, the present invention can be attached to the hood through the magnet and the warning light is adapted to illuminate.

In another embodiment, the multi-functional car power receptacle having a lifesaving tool of the present invention comprises a handle for providing a receptacle and a function head connected to a front end of the handle. The function head is electrically connected with the handle. The function head comprises an elastic head mounted in a housing as a positive pole for charging and a smasher. A rear end of the elastic head is provided with a spring, a button connected with the spring for the elastic head to extend out of the housing when the button is pressed, and an engaging buckle mounted on the housing as a negative pole for charging.

Preferably, the function head and the front end of the handle are connected through a rotation shaft, and the function head is electrically connected with the handle through electric wires passing through the rotation shaft.

Preferably, the function head is connected with the handle through a line.

Preferably, the handle is further provided with a seat belt cutter.

Preferably, the handle is provided with a magnet and a warning light.

Preferably, the handle has at least one receptacle shunt hole and at least one USB (Universal Serial Bus) port.

In the present invention, the original receptacle is slightly modified for the function head to combine the power plug and glass smasher. The product can be plugged into a power socket in a car all the time. It is not easy to lose the receptacle, and it is convenient for taking and use. If necessary, the product can be attached to the window and the button is pressed for the elastic head to extend out of the housing to smash the window.

DETAILED DESCRIPTION OF THE PREFERRED EMBODIMENTS

Embodiments of the present invention will now be described, by way of example only, with reference to the accompanying drawings.

Figure 1:
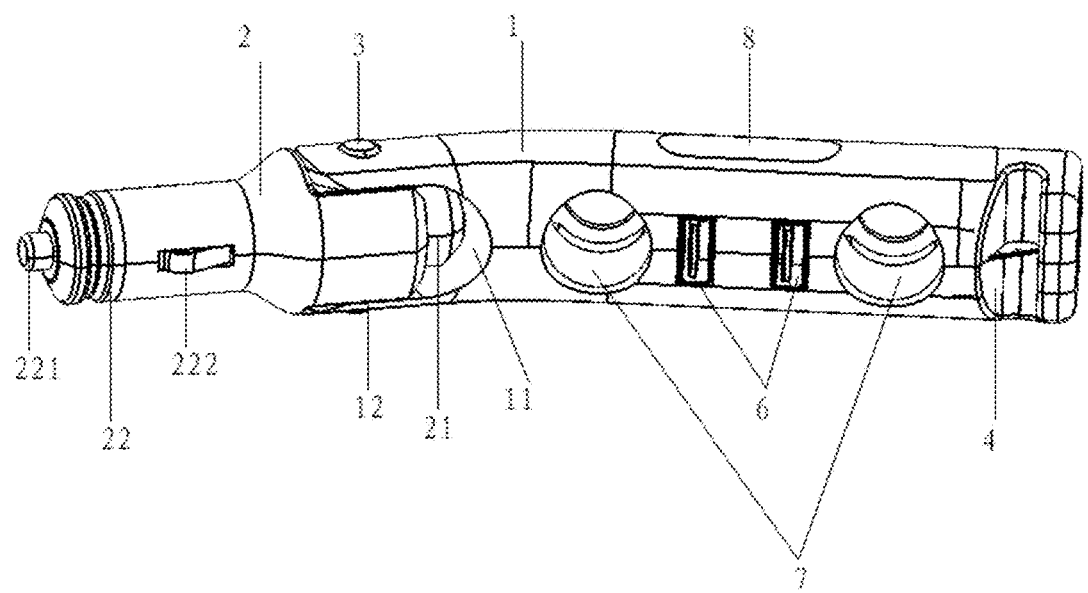
FIG. 1 is a first schematic view according to a first embodiment of the present invention.
Figure 2:
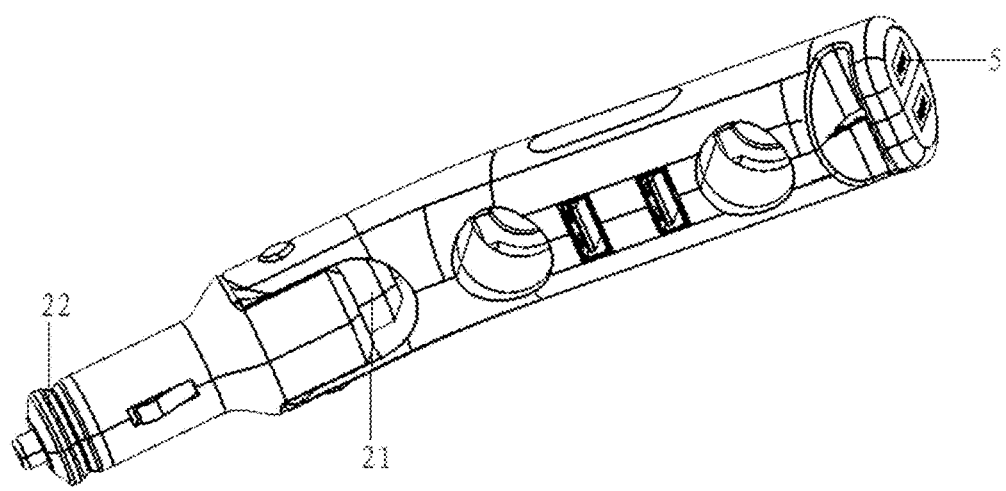
FIG. 2 is a second schematic view according to the first embodiment of the present invention.
Figure 3:
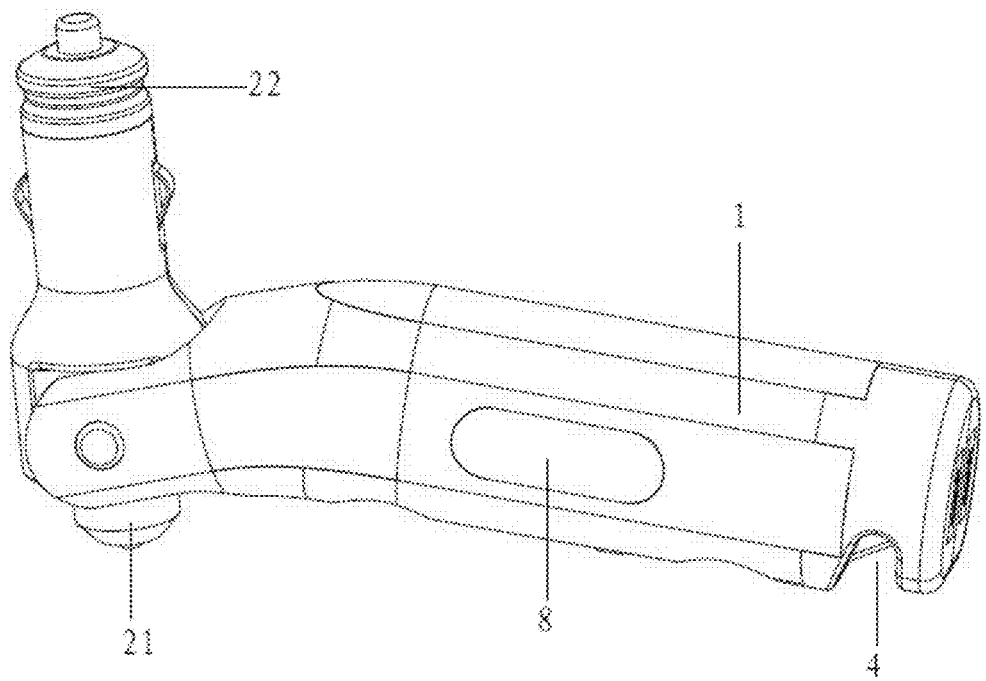
FIG. 3 is a third schematic view according to the first embodiment of the present invention.

FIG. 1 to FIG. 3 shows a first embodiment of the present invention. In this embodiment, the multi-functional car power receptacle having a lifesaving tool according to the first embodiment of the present invention comprises a handle 1 for providing a receptacle and a function head 2 connected to a front end of the handle 1. The function head 2 comprises a glass smasher 21 and a power plug 22. The function head 2 and the front end of the handle 1 are connected through a rotation shaft or electric wires, enabling the function head 2 to pivot about the rotation shaft for changing an end of the function head 2 to be used. The power plug 22 is electrically connected with the handle 1 through the electric wires of the rotation shaft.

The power plug 22 is electrically connected with the handle 1. The function head 2 and the front end of the handle 1 are connected through a rotation shaft 3.

Referring to FIG. 3, two connecting sides 12 extend from left and right sides of the front end of the handle 1. An accommodation trough 11 is defined between the two connecting sides 12. Two ends of the rotation shaft 3 are fixed to the two connecting sides 12, enabling the function head 2 to pivot about the rotation shaft 3 for changing the end of the function head 2 accommodated in the accommodation trough 11. That is to say, when the user wants to use the glass smasher 21, the function head 2 is rotated for the power plug 22 to be accommodated in the accommodation trough 11, alternatively, the function head 2 is rotated for the glass smasher 21 to be accommodated in the accommodation trough 11. The glass smasher 21 is combined with the power plug 22 to become one-piece, not occupying the limited space. Through the rotation shaft 3, the glass smasher 21 and the power plug 22 of the function head 2 can be replaced.

The power plug 22 comprises a middle elastic head 221 as the positive pole and an engaging buckle 222 at two ends of the elastic head 221 as the negative pole. The power plug 22 is adapted to plug into a connecting port of the existing power socket in a car. When the glass smasher 21 is not used, the power plug 22 is plugged into the connecting port of the power socket to be positioned thereat. It is not easy to lose the receptacle, and it is convenient for taking and use.

The handle 1 comprises a circuit board (not shown in the drawings) therein. The circuit board is connected with the power plug 22 through electric wires. For pleasing appearance and safety, the electric wires are disposed in the rotation shaft 3.

The handle 1 has at least one USB (Universal Serial Bus) port and at least one receptacle shunt hole. In this embodiment, the handle 1 has two USB ports 6 and two receptacle shunt holes 7. The USB ports 6 can be used for an electric appliance having a USB to be charged. The receptacle shunt holes 7 can be installed with a plurality of receptacles.

The handle 1 is further provided with a seat belt cutter 4. In an emergency, the driver can cut the seat belt by using the seat belt cutter 4 so as to flee the car.

The rear end of the handle 1 is provided with a magnet 5. When it is not convenient for the user to hold the handle 1, the handle 1 can be attracted to an iron article. The left and right sides of the handle 1 are provided with warning lights 8. When driving on the freeway at night, in case of a malfunction of the engine, the driver can repair the car through the light of the warning lights. 8

Figure 4:
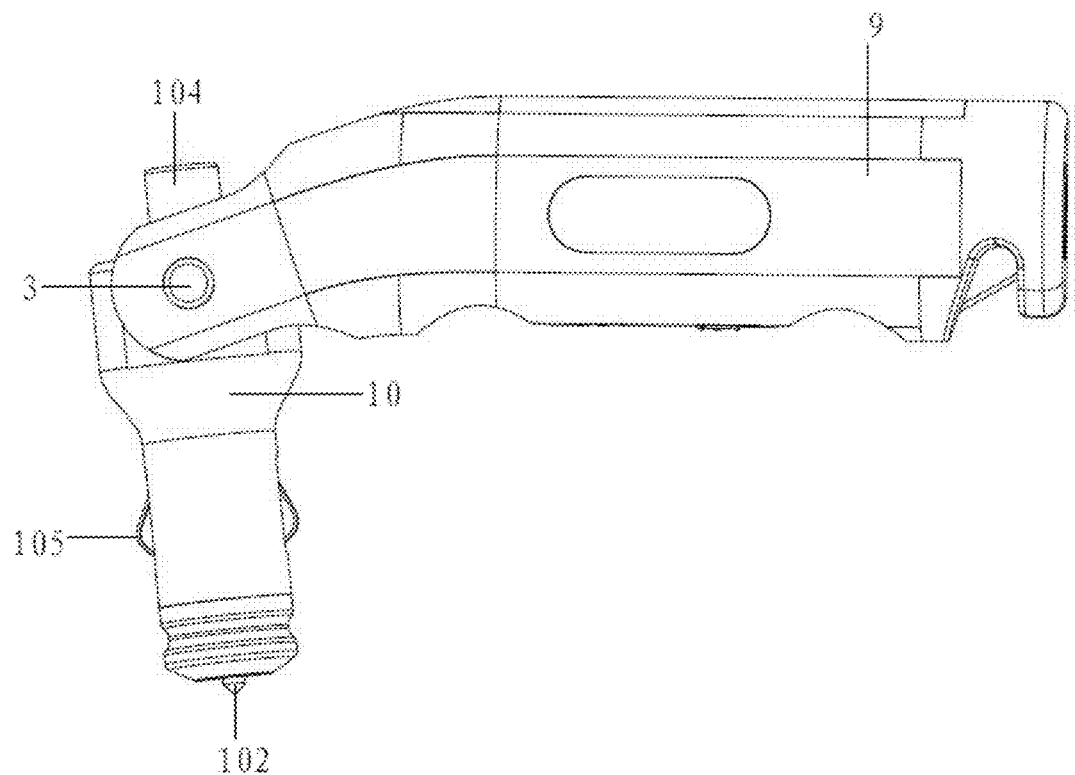
FIG. 4 is a schematic view according to a second embodiment of the present invention.

FIG. 4 shows a second embodiment of the present invention. The multi-functional car power receptacle having a lifesaving tool according to the second embodiment of the present invention comprises a handle 9 for providing a receptacle and a function head 10 connected to a front end of the handle 9. The function head 10 is electrically connected with the handle 9. The function head 10 comprises an elastic head 102 mounted in a housing 101 as the positive pole for charging and a smasher. A rear end of the elastic head 102 is provided with a spring 103, a button 104 connected with the spring 103 for the elastic head 102 to extend out of the housing 101 when the button 104 is pressed, and an engaging buckle 105 mounted on the housing 101 as the negative pole for charging.

Figure 5:
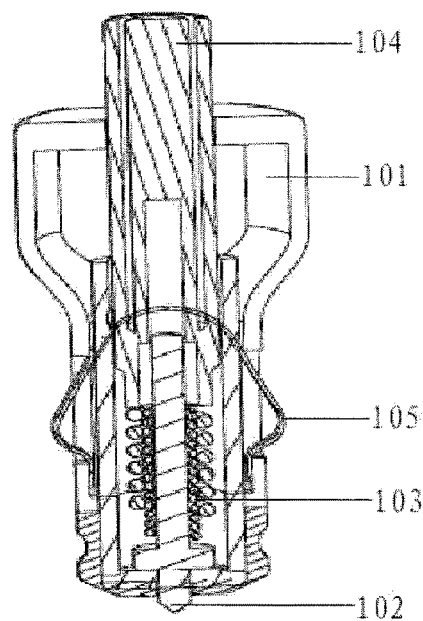
FIG. 5 is a sectional view according to the second embodiment of the present invention.

As shown in FIG. 5, in a normal state, a portion of the elastic head 102 extends out of the housing 101 as the positive pole when connected with the power socket in a car. When it is necessary to smash the window, the button 104 is pressed for the elastic head 102 to extend out of the housing 101 as a smasher to smash the window.

Referring to FIG. 4, the function head 10 and the front end of the handle 9 are connected through a rotation shaft 3. The function head 10 is electrically connected with the handle 9 through electric wires passing through the rotation shaft 3.

Figure 6:
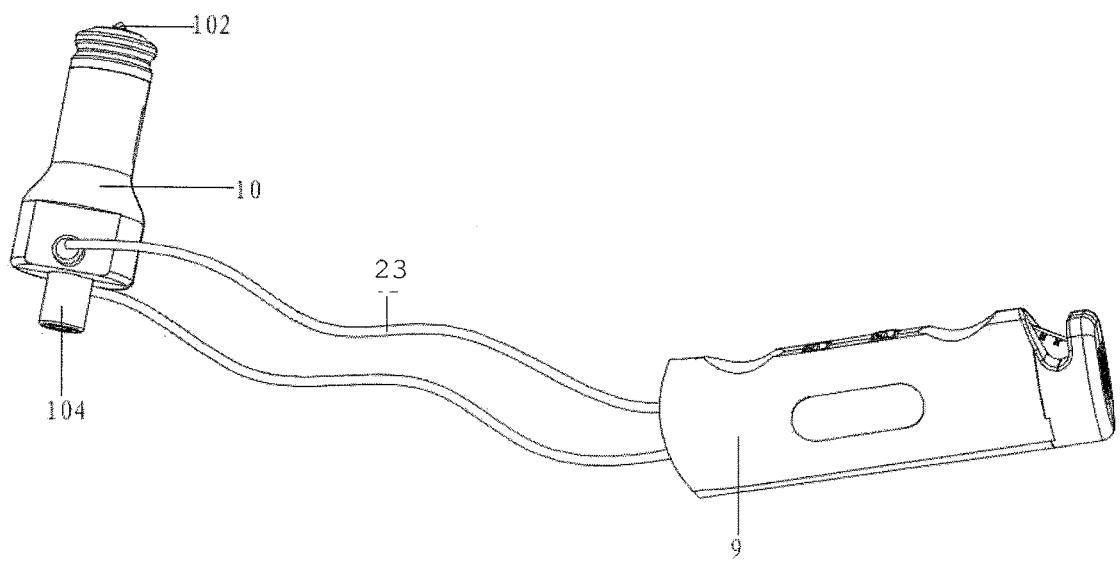
FIG. 6 is a schematic view according to a third embodiment of the present invention.

FIG. 6 shows a third embodiment of the present invention. The function head 10 is connected with the handle 9 through fixing lines 23. The electric wires for connecting the function head 10 with the handle 9 are arranged along the fixing lines 23, alternatively, the fixing lines 23 are replaced with the electric wires.

In the second and third embodiments, the handle 10 is also provided with a seat belt cutter, a magnet, and warning lights. The handle 10 also has receptacle shunt holes and USB ports. The function is the same as the first embodiment and won't be described again.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-functional car power receptacle having a lifesaving tool, comprising a handle for providing a receptacle and a function head connected to a front end of the handle, the function head comprising a glass smasher at one end and a power plug at the opposite end, the function head and the front end of the handle being connected through a rotation shaft, enabling the function head to pivot about the rotation shaft for changing an end of the function head to be used, the power plug being electrically connected with the handle through electric wires of the rotation shaft.

2. The multi-functional car power receptacle having a lifesaving tool as claimed in claim 1, wherein the handle is further provided with a seat belt cutter.

3. The multi-functional car power receptacle having a lifesaving tool as claimed in claim 1, wherein the handle is provided with a magnet and a warning light.

4. The multi-functional car power receptacle having a lifesaving tool as claimed in claim 1, wherein the handle has at least one receptacle shunt hole and at least one USB (Universal Serial Bus) port.

5. A multi-functional car power receptacle having a lifesaving tool, comprising a handle for providing a receptacle and a function head connected to a front end of the handle, the function head being electrically connected with the handle, the function head comprising an elastic head mounted in a housing functioning both as a positive pole for charging and a smasher, a rear end of the elastic head being provided with a spring, a button connected with the spring for the elastic head to extend out of the housing when the button is pressed, and an engaging buckle mounted on the housing as a negative pole for charging.

6. The multi-functional car power receptacle having a lifesaving tool as claimed in claim 5, wherein the function head and the front end of the handle are connected through a rotation shaft, and the function head is electrically connected with the handle through electric wires passing through the rotation shaft.

7. The multi-functional car power receptacle having a lifesaving tool as claimed in claim 6, wherein the handle is further provided with a seat belt cutter.

8. The multi-functional car power receptacle having a lifesaving tool as claimed in claim 7, wherein the handle is provided with a magnet and a warning light.

9. The multi-functional car power receptacle having a lifesaving tool as claimed in claim 8, wherein the handle has at least one receptacle shunt hole and at least one USB (Universal Serial Bus) port.

10. The multi-functional car power receptacle having a lifesaving tool as claimed in claim 5, wherein the function head is connected with the handle through a line.

11. The multi-functional car power receptacle having a lifesaving tool as claimed in claim 10, wherein the handle is further provided with a seat belt cutter.

12. The multi-functional car power receptacle having a lifesaving tool as claimed in claim 11, wherein the handle is provided with a magnet and a warning light.

13. The multi-functional car power receptacle having a lifesaving tool as claimed in claim 12, wherein the handle has at least one receptacle shunt hole and at least one USB (Universal Serial Bus) port.

* * * * *